W. A. RIDDELL.
CAMERA CARRIAGE.
APPLICATION FILED OCT. 20, 1915.
1,213,544.
Patented Jan. 23, 1917.
2 SHEETS—SHEET 1.
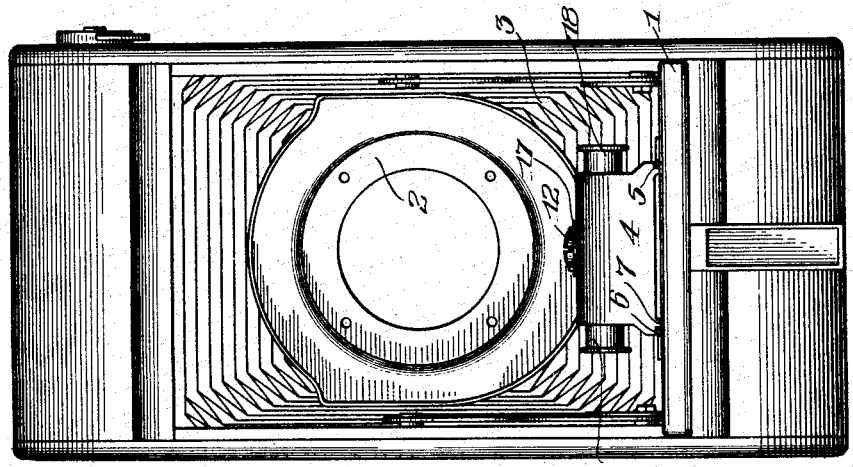
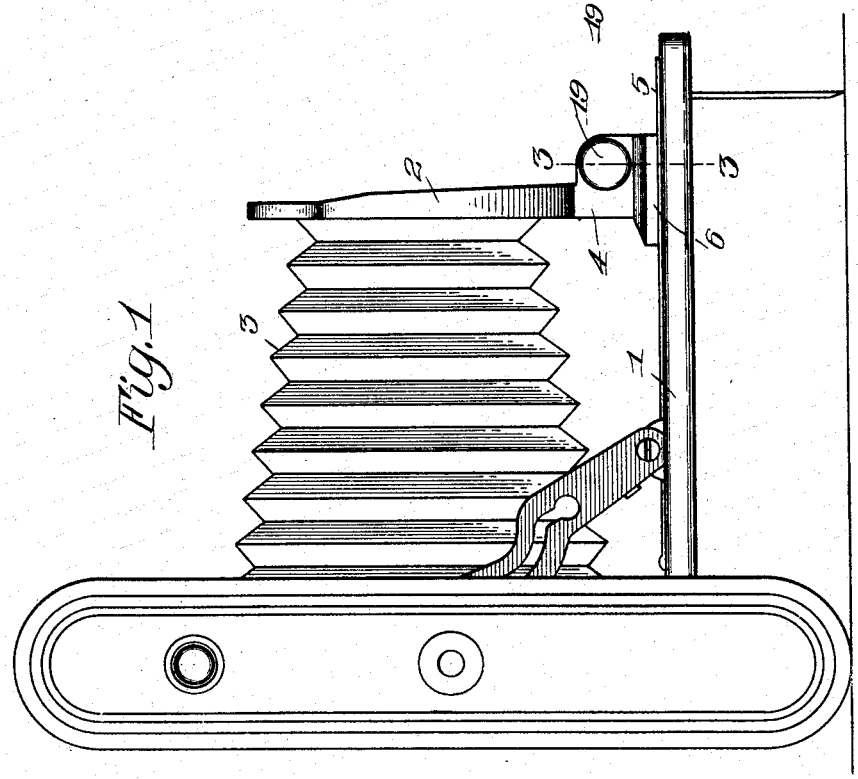
WITNESS
Nelson H. Copp
INVENTOR
William A. Riddell
BY
Churchill Rich
his ATTORNEYS

W. A. RIDDELL.
CAMERA CARRIAGE.
APPLICATION FILED OCT. 20, 1915.

1,213,544.

Patented Jan. 23, 1917.
2 SHEETS—SHEET 2.

WITNESS
Nelson H. App

INVENTOR
William A. Riddell

BY
Church & Rich
his ATTORNEYS

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

CAMERA-CARRIAGE.

1,213,544.  Specification of Letters Patent.  Patented Jan. 23, 1917.

Application filed October 20, 1915. Serial No. 56,949.

*To all whom it may concern:*

Be it known that I, WILLIAM A. RIDDELL, of Rochester, in the county of Monroe and State of New York, have invented certain new and useful Improvements in Camera-Carriages; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple, cheap and effective means for locking the focusing element of a camera, such as the front or lens carriage, in different positions of adjustment on the camera bed. The improvements are directed in part toward reducing the number of parts and the space occupied thereby and toward increasing the efficiency of the clamping parts without rendering them difficult to release by the operator's fingers.

To these and other ends the invention resides in certain improvements and combinations of parts all as will be hereinafter more fully described, the novel features being pointed out in the claims at the end of the specification.

Figure 3:
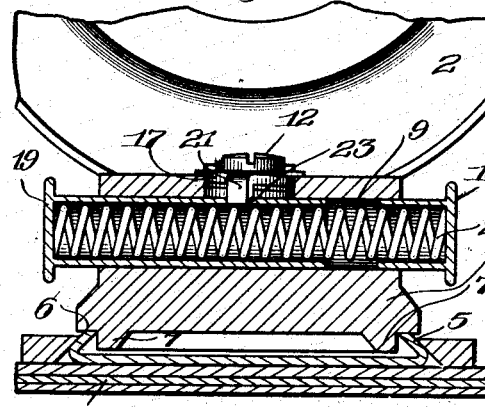
Figure 5:
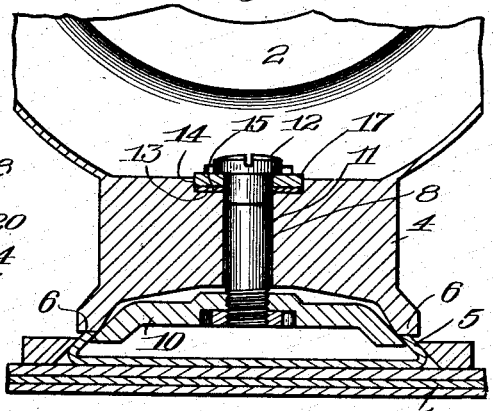
Figure 4:
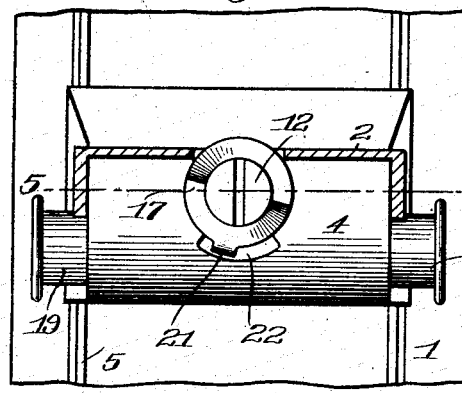
Figure 6:
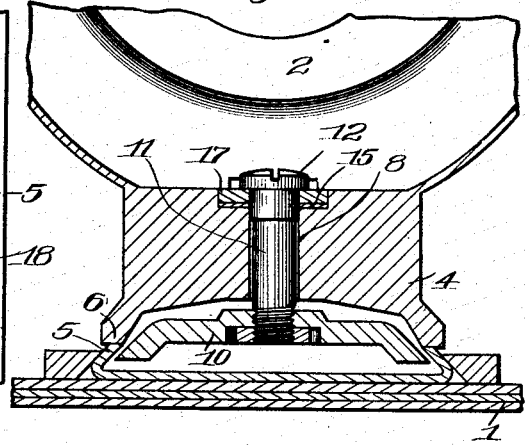
Figure 7:
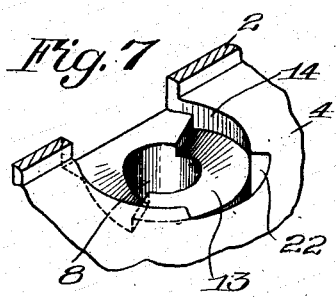
Figure 8:
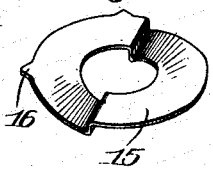
Figure 9:
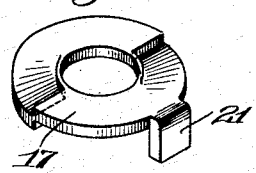

In the drawings: Figure 1 is a side elevation of a photographic camera provided with a focusing device embodying a lens carriage constructed in accordance with and illustrating one embodiment of my invention; Fig. 2 is a front elevation thereof; Fig. 3 is an enlarged section taken substantially on the line 3—3 of Fig. 1 with the parts in their normal or clamping position; Fig. 4 is a top plan view of the carriage partly in horizontal section through the front board also with the parts in the normal position and on an enlarged scale; Fig. 5 is a vertical section taken substantially on the line 5—5 of Fig. 4; Fig. 6 is a view similar to Fig. 5 with the clamping member released; Fig. 7 is a detail perspective view of the cam track on the carriage block; Fig. 8 is a detail perspective view of the wear plate that rests upon the cam track, and Fig. 9 is a detail perspective view of the rotary cam that rests on the wear plate.

Similar reference numerals throughout the several figures indicate the same parts.

In the embodiment of the invention illustrated, 1 indicates the camera bed and 2 the front or lens board with which the bellows 3 is connected mounted on the carriage block 4.

The bed 1 is provided with undercut tracks (Fig. 3) indicated at 5 on which slide lips 6 on the carriage block while shoulders 7 on the latter project down between the tracks to prevent lateral movement.

The carriage block 4 is pierced centrally by a vertical bore or aperture 8 while forwardly thereof it is pierced by a horizontal transverse bore 9. A cross-head 10 having inclined ends, as shown, extends beneath both tracks 5 in a manner to clamp against them when raised, such cross-head being located beneath the carriage. Rigidly connected thereto is a stem 11 extending vertically through the aperture 8 in the carriage block and terminating in a head or shoulder 12 above the latter. A spiral or double cam track 13 is formed in the block 4 at the bottom of a recess 14 to surround the aperture 8 and the stem 11. Resting on this cam track is a similarly formed wear plate or spring washer 15 having projections 16 that engage the walls of the recess 14 to prevent it from turning while on top of the washer is placed a rotary cam disk 17 that turns about the stem 8 beneath the head 12 thereof.

It will be obvious from an inspection of Figs. 7, 8 and 9 that as the cam plate 17 is rotated to the right, it will ride upon the cam track and, reacting against the head 12 of the spindle, raise the cross-head 10 from the position of Fig. 6 so that it will clamp against the under sides of the tracks 5 in opposition to the carriage block 4 and lock the latter to the track in a fixed position on the bed. This locking position of the cross-head is its normal position and it is maintained in the following manner: Fixed in the right hand end of the horizontal bore 9 is a tubular finger piece 18 while slidable in the remaining portion of said bore or recess to project from the opposite side of the block 4 is a tubular finger piece 19 that may be pressed inwardly when the thumb and fore finger are placed upon the two finger portions against the tension of an inclosed coiled spring 20. A downwardly projecting finger 21 on the cam disk 17 operates in a segmental slot 22 in the top of the block 4 that intersects the bore 9 and engages in a recess 23 in the tubular portion of the reciprocatory finger piece 19. Thus, the tendency of the spring 20 is to move the finger piece 19 outwardly and rotate the cam disk 17 to the right which, as before described, raises the cross-head 10 and locks the carriage. When the finger piece 19 is pressed inwardly, it rotates the cam disk 17 to the left and lowers the cross-head to the disengaged position of Fig. 6 permitting the carriage to be moved freely on the track, a slight spring in the wear plate or washer 15 preferably contributing to the certainty of this disengaging action.

It will be seen that the cam action gives great power to the clamping movement, while at the same time the leverage on the cam disk 17 is in favor of both the operator and the spring 20 which latter need not be made exceptionally heavy.

I claim as my invention:

1. In a camera, the combination with a track and a block movable thereon, of a track gripping member comprising a cross-head adapted to engage the track in opposition to the block and a stem connected to the cross-head and extending through the block, a rotary cam arranged to turn about the stem as a center and to act against the latter and against the block and a thrust member for actuating the cam.

2. In a camera, the combination with a track and a block movable thereon and provided with a circular cam track, of a track gripping member comprising a cross-head adapted to engage the track in opposition to the block and a stem connected to the cross-head and extending through the block centrally of the cam track, a rotary cam disk arranged to turn about the stem as a center and to act against the latter and against the cam track, said disk being provided with an offset finger and a thrust member arranged to reciprocate in the block and to coöperate with the said finger on the cam disk.

3. In a camera carriage, the combination with a track and a block slidable on top of the latter, of a cross-head engaging beneath the track, a stem on the cross-head extending through the block and having a headed portion and a rotary cam arranged to turn on the stem and to act against the headed portion thereof and against the block to raise the cross-head into gripping engagement with the track.

4. In a camera carriage, the combination with a track and a block movable thereon and provided with a vertical opening surrounded by a cam track and with a transverse recess, of a cross-head adapted to engage the track in opposition to the block, a stem on the cross-head extending through the vertical opening, a cam disk mounted to turn on the stem and to coöperate with the cam track to move the stem vertically and a thrust member arranged to reciprocate in the transverse opening and to coöperate with the cam disk to turn the latter.

5. In a camera carriage, the combination with a track and a carriage block movable thereon having a transverse recess therein, of a clamping member adapted to engage the track in opposition to the carriage block, a rotary device for said member, a tubular thrust member for actuating the rotary device arranged to reciprocate in the recess in the carriage block and a spring within the tubular thrust member for moving the latter in one direction.

WILLIAM A. RIDDELL.

Witnesses:
P. WESLEY HART,
F. M. PAGE.

Copies of this patent may be obtained for five cents each, by addressing the "Commissioner of Patents, Washington, D. C."